B. GHERARDI.
METHOD AND MEANS FOR AVOIDING INTERFERENCE.
APPLICATION FILED DEC. 5, 1918.
1,311,808.
Patented July 29, 1919.
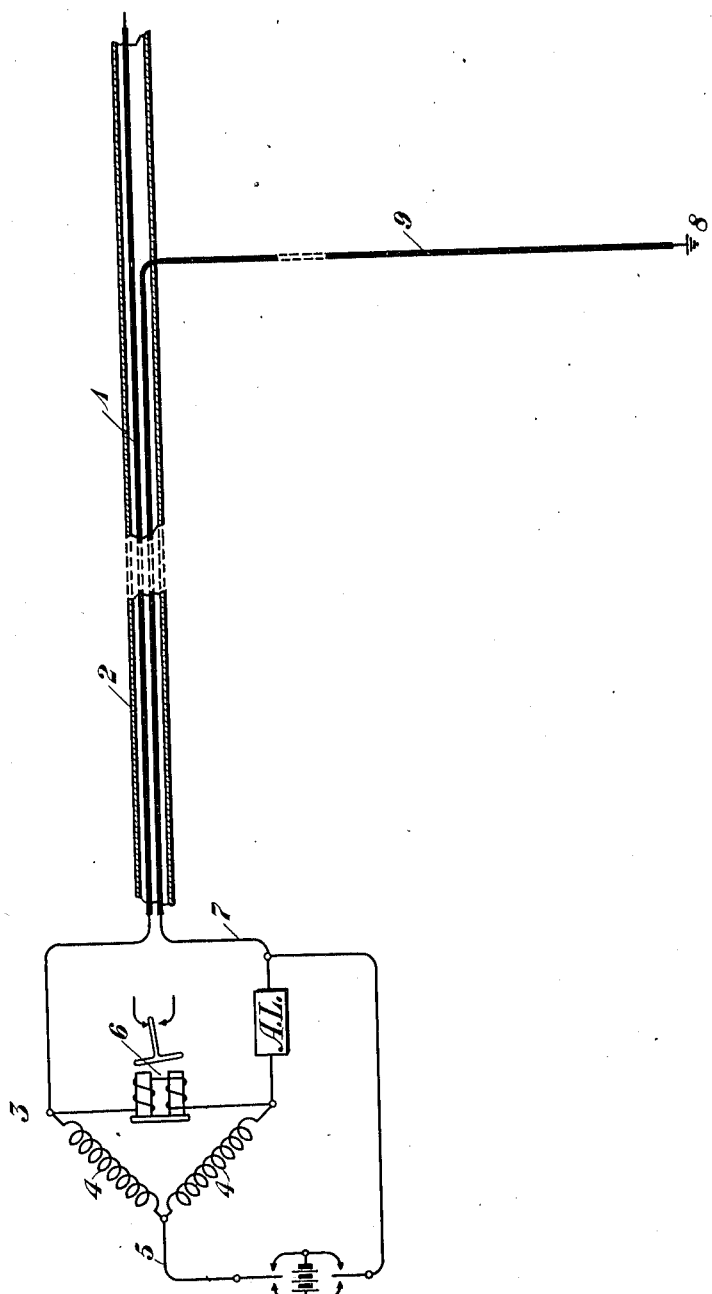
INVENTOR.
B. Gherardi
BY G. E. Folk.
ATTORNEY

UNITED STATES PATENT OFFICE.

BANCROFT GHERARDI, OF BAYHEAD, NEW JERSEY, ASSIGNOR TO AMERICAN TELEPHONE AND TELEGRAPH COMPANY, A CORPORATION OF NEW YORK.

METHOD AND MEANS FOR AVOIDING INTERFERENCE.

1,311,808.      Specification of Letters Patent.      Patented July 29, 1919.

Application filed December 5, 1918. Serial No. 265,457.

*To all whom it may concern:*

Be it known that I, BANCROFT GHERARDI, residing at Bayhead, in the county of Ocean and State of New Jersey, have invented certain Improvements in Methods and Means for Avoiding Interference, of which the following is a specification.

This invention relates to signaling or other transmission circuits using a ground-return, and its object is to minimize interference in such circuits, due to extraneous sources of current. It is especially valuable for use with ocean cables because of the weak character of the received signals and the great difficulties due to interference but is applicable wherever a transmission line is associated more or less intimately with a conductor or conductors in continuous or frequent contact with the ground. The ocean cable with metallic armor is a familiar example of such a condition and the invention is here illustrated as applied to such a cable.

It is regular practice to ground the return circuit for submarine cables on the metallic armor of the cable since it presents a large metallic surface in immediate contact with the earth and water. The ground is usually made some distance out at sea for the purpose of avoiding interference due to local fluctuating ground potentials in the shore region. Notwithstanding this, interference arises not attributable to induction in the line conductors and whose source is sometimes difficult to trace. Such interference becomes especially evident when correcting networks and thermionic amplifiers are used with the receiving apparatus and constitutes a limiting factor in the speed of operation attainable.

By grounding the return circuit, in accordance with the present invention interference of the character in question may be materially reduced or eliminated and the speed and quality of the signals improved. The improvement may be attributable to the fact that under the usual practice the adjacent exposed conductors being of low resistance, and extending unbroken for long distances in intimate contact with the earth and water collect and lead to the line conductors through the grounding point, stray currents and disturbances of a static character due to meteorological conditions or other causes which would not otherwise reach the transmitting circuit in sufficient strength to be noticeable. I have discovered that the interference experienced in such systems can be largely overcome if the point of grounding be so selected with reference to the adjacent cable sheath and other exposed conductors that a potential drop in the disturbing currents will occur between the exposed conductor and the grounding point which is comparable in a substantial degree to the disturbing potential at those conductors.

The accompanying drawing illustrates diagrammatically a ground connection for an ocean cable made in accordance with the invention.

The cable 1 is provided with the usual metallic armor 2, which in ocean cables, is in electrical contact with the water and the earth. The cable is here illustrated as terminating in the usual duplex set 3, comprising ratio arms 4—4 with the transmitting lead 5 connected to their junction, and the receiving device 6 connected between the main and artificial line at their extremities. The conductor 7, which may or may not be within the cable sheath as shown, leads from the artificial line to the sea ground connection, usually some miles out. Ordinarily, as above indicated, this conductor is brought out and grounded immediately upon the metallic armor 2 of the cable. According to the present invention, the grounding is done at a point 8 remote from the cable sheath, and by means of a coil of wire, a plate, or the like, giving sufficient surface in contact with the earth and water, the grounding point being chosen with reference to the cable and other exposed conductors, to give a potential drop in the disturbing currents between the grounding point and such conductors, which is substantial with respect to the disturbing potentials.

If the conductor 7 is within the cable or otherwise closely related to it, a lead 9 is extended laterally from the cable to the desired point, and this lead should be well insulated and free from continuous exposed conductors, such as metallic sheathing forming a low resistance path back to the region of the cable. If armor is used on the conductor 9 it should be in insulated sections.

The distance from the cable 1 at which the ground connection will be made depends upon the character of the interfering currents to be dealt with, and to a degree upon the character of the signaling circuit. A distance of the order of a few thousand feet would serve in most cases.

The invention is, of course, not limited to the particular arrangement herein shown and described. For instance the lateral lead 9 may be replaced by any convenient means for uniting the terminal apparatus with a ground connection at a substantial distance from the sheath of cable 1 and other adjacent exposed conductors.

What is claimed is:

1. The method of avoiding disturbance from outside sources in the terminal apparatus of transmission lines using a ground return, and having associated therewith a metallic armor or other conducting medium in electrical connection with the earth, which consists in making the ground connection at a point remote from the armor or conducting medium associated with the line, and insulating from the ground all conductors leading from the grounding point toward the line, whereby a potential drop, high with respect to the potential of the disturbing currents, will exist in such currents between the ground point and said armor or conducting medium.

2. The method of avoiding disturbance from outside sources in the terminal apparatus of transmission lines using a ground return, and having associated therewith a metallic armor or other conducting medium in electrical connection with the earth, which consists in making the ground connection for the return circuit at a point electrically remote from the cable armor or other conducting medium leading to regions of disturbance, whereby a potential drop, high with respect to the potential of the disturbing currents, will exist in such currents between the ground point and such armor or conducting medium.

3. In a signaling system, a transmission line, a metallic sheath or other conducting medium in proximity thereto, and conductively related to the ground, and a grounded return connection for the line comprising an insulated conductor without continuous metallic armor or other conducting medium exposed to contact with the earth, and having its end grounded at a distance from the cable armor or other conductor exposed to contact with the earth, sufficient to cause a potential drop in disturbing currents passing to the ground connection from such armor or exposed conductor which is substantial with reference to the potential of the disturbing currents.

4. In a signaling system using an insulated transmission line, and a ground return, and in which the insulated line is associated with a metallic armor or other conducting medium in electrical connection with the ground, a ground connection for the return, comprising an insulated conductor of low resistance without continuous metallic armor or other conducting medium exposed to contact with the ground, and extending to a grounding point whose distance from the said main line armor or other associated conducting medium is such as to cause a potential drop in the disturbing currents between the two, substantial with reference to the potential of the disturbing currents.

5. In a signaling system, a transmission line and a ground return connection for said line, comprising an insulated conductor having its end grounded at a distance from all metallic conductors carrying extraneous currents, sufficient to cause a potential drop in disturbing currents passing from such conductors to the ground point, which is substantial with reference to the potential of the disturbing currents.

6. The method of avoiding disturbance from outside sources in the terminal apparatus of transmission lines using a ground-return, which consists in making the ground connection for the return circuit at a point electrically remote from all metallic conductors carrying extraneous currents, whereby a potential drop which is substantial with reference to the potential of the disturbing currents will exist between the grounding point and such conductors.

7. In a signaling system, a transmission line having in proximity thereto a metallic sheath or other conducting medium conductively related to the ground, and a ground return connection for said line extending to, and grounded at, a point beyond the influence of the potentials caused by disturbances in said sheath or other medium.

In testimony whereof, I have signed my name to this specification this third day of December, 1918.

BANCROFT GHERARDI.